(12) United States Patent
Sun et al.

(10) Patent No.: US 12,445,860 B2
(45) Date of Patent: Oct. 14, 2025

(54) COMMON ANALOG BEAM STEERING FOR BAND GROUPS

(71) Applicant: Apple Inc., Cupertino, CA (US)

(72) Inventors: Haitong Sun, Irvine, CA (US); Wei Zeng, San Diego, CA (US); Dawei Zhang, Saratoga, CA (US); Yuchul Kim, Santa Clara, CA (US); Hong He, Cupertino, CA (US); Yuqin Chen, Shenzhen (CN); Yushu Zhang, Beijing (CN); Sohrab Emami-Neyestanak, San Francisco, CA (US); Michael Gordon, San Jose, CA (US); Mark G. Forbes, San Carlos, CA (US); Xiang Guan, Santa Clara, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 16/978,559

(22) PCT Filed: Sep. 6, 2019

(86) PCT No.: PCT/CN2019/104667
§ 371 (c)(1),
(2) Date: Sep. 4, 2020

(87) PCT Pub. No.: WO2021/042361
PCT Pub. Date: Mar. 11, 2021

(65) Prior Publication Data
US 2023/0110967 A1    Apr. 13, 2023

(51) Int. Cl.
*H04W 16/28*    (2009.01)
*H04W 8/22*    (2009.01)

(52) U.S. Cl.
CPC ............ *H04W 16/28* (2013.01); *H04W 8/22* (2013.01)

(58) Field of Classification Search
CPC ......... H04W 8/24; H04W 8/22; H04W 16/28; H04B 7/0617; H04B 7/0404; H04B 7/0628
See application file for complete search history.

(56) References Cited

U.S. PATENT DOCUMENTS

| 6,111,542 A  * | 8/2000 | Day | ...................... | H01Q 21/06 |
| | | | | 342/359 |
| 9,609,654 B1 * | 3/2017 | Desclos | ................ | H04W 36/00 |

(Continued)

FOREIGN PATENT DOCUMENTS

| CN | 108123738 | 6/2018 |
| JP | 2017539115 | 12/2017 |

(Continued)

OTHER PUBLICATIONS

Office Action for Japanese Pat. Application No. 2022-513900; Mar. 6, 2023.

(Continued)

*Primary Examiner* — Congvan Tran
(74) *Attorney, Agent, or Firm* — Kowert, Hood, Munyon, Rankin & Goetzel, P.C.

(57) ABSTRACT

Apparatuses, systems, and methods for a wireless device and a cellular base station to support common analog beam steering for band groups. The wireless device may provide an indication of analog beam steering capability of the wireless device to the cellular base station. For example, the wireless device may support a limited number of analog beams for each of one or more band groups. The cellular base station may select beam configuration information for the wireless device based at least in part on the indication of analog beam steering capability of the wireless device. This may include selecting a common beam for multiple component carriers for the wireless device based on the wireless (Continued)

device's analog beam steering capability. The cellular base station may provide the beam configuration information to the wireless device.

20 Claims, 9 Drawing Sheets

(56) References Cited

U.S. PATENT DOCUMENTS

| | | | | |
|---|---|---|---|---|
| 10,880,895 | B2* | 12/2020 | Gordaychik | H04W 52/18 |
| 11,343,728 | B2* | 5/2022 | Park | H04W 36/00837 |
| 2013/0095816 | A1* | 4/2013 | Gerstenberger | H04B 7/0413 455/422.1 |
| 2013/0301454 | A1 | 11/2013 | Seol | |
| 2014/0269414 | A1* | 9/2014 | Hyde | H01Q 3/26 370/254 |
| 2014/0362748 | A1* | 12/2014 | Barany | H04L 5/0092 370/281 |
| 2014/0369394 | A1* | 12/2014 | Ruuska | H04W 16/28 375/224 |
| 2016/0150494 | A1 | 5/2016 | Tabet | |
| 2016/0205592 | A1 | 7/2016 | Koskinen | |
| 2016/0337027 | A1* | 11/2016 | Jalali | H04B 7/18504 |
| 2017/0084994 | A1* | 3/2017 | Tran | H01Q 3/08 |
| 2017/0215065 | A1* | 7/2017 | Vamanan | H04W 8/22 |
| 2018/0006845 | A1* | 1/2018 | Kim | H04L 25/0204 |
| 2018/0027585 | A1 | 1/2018 | Guo | |
| 2018/0076857 | A1 | 3/2018 | Jung et al. | |
| 2019/0110210 | A1* | 4/2019 | Takeda | H04B 7/0617 |
| 2019/0141742 | A1* | 5/2019 | Zhou | H04L 5/0064 |
| 2019/0150031 | A1* | 5/2019 | Balasubramanian | H04W 36/0022 370/329 |
| 2019/0182898 | A1 | 6/2019 | Yu | |
| 2019/0239092 | A1 | 8/2019 | Zhou | |
| 2019/0253925 | A1* | 8/2019 | Gholmieh | H04B 1/005 |
| 2019/0261369 | A1* | 8/2019 | Verma | H04B 7/0619 |
| 2019/0267709 | A1* | 8/2019 | Mow | H01Q 21/24 |
| 2019/0357292 | A1* | 11/2019 | Cirik | H04L 5/0053 |
| 2019/0363843 | A1* | 11/2019 | Gordaychik | H04W 72/044 |
| 2020/0084735 | A1* | 3/2020 | Cheng | H04W 24/10 |
| 2020/0120458 | A1* | 4/2020 | Aldana | H04W 12/069 |
| 2020/0221290 | A1* | 7/2020 | Wiemann | H04W 72/0453 |
| 2021/0344382 | A1* | 11/2021 | Choi | H04L 5/0023 |
| 2021/0360429 | A1* | 11/2021 | Reial | H04W 8/24 |

FOREIGN PATENT DOCUMENTS

| | | |
|---|---|---|
| JP | 2018522508 | 8/2018 |
| KR | 20140053580 | 5/2014 |
| WO | 2017143893 | 8/2017 |
| WO | 2018118788 | 6/2018 |
| WO | 2019062542 | 4/2019 |

OTHER PUBLICATIONS

Huawei et al. "Beam reporting for beam management"; 3GPP TSG RAN WG1 Meeting #90 R1-1713757; Prague, CZ; Aug. 21, 2017.
Samsung "Discussion on cross-carrier beam management"; 3GPP TSG RAN WG1 Meeting #91 R1-1720305; Reno, USA; Nov. 27, 2017.
NTT Docomo, Inc. "Remaining issues on scheduling availability of UE during intra-frequency measurement"; 3GPP TSG RAN WG4 Meeting #86bis R4-1804609; Melbourne, AU; Apr. 16, 2018.
Qualcomm Inc " Temporary Capability Restriction for standalone Nr"; 3GPP TSG-RAN WG2 Meeting #1807 R2-1811129; Gothenburg, Sweden; Aug. 20, 2018.
ZTE "TP of TEI proposal on CSI trigger for non-active BWP" 3GPP TSG RAN WG1 Meeting #98 R1-1909832; Prague, CZ; Aug. 26, 2019.
VIVO "Discussion on Enhancements on Multi-Beam Operation"; 3GPP TSG RAN WG1 Meeting #95 R1-1812324; Spokane, USA; Nov. 12, 2018.
International Search Report & Written Opinion of PCT/CN2019/104667 mailed May 27, 2020, 9 pages.
Extended European Search Report for EP Patent Application No. 19944531.3; Mar. 23, 2023.
Samsung: "Discussion on cross-carrier beam management"; 3GPP TSG RAN WG1 NR AH#3 RI-1715963; Sep. 18, 2017.
LG Electronics: "Discussion on MR.TD and MTTD for FR2 inter-band NR CA in Rel-15", 3GPP TSG-RAN WG4#90 Meeting R4-1900536; Feb. 25, 2019.
Intel Corporation: "Temporary UE 1-15 capability restriction Stage-2 framework", 3GPP TSG RAN WG2 Meeting #AH R2-1809800; Jul. 2, 2018.
Huawei Device et al: "Report of offline 1-15 discussion #17 on UE overheating problem"; 3GPP TSG-RAN WG2 #98 R2-1706074; May 15, 2017.
Notice of Preliminary Rejection for KR Patent Application No. 10-2022-7007258; Mar. 29, 2024.
NTT Docomo Inc. "Summary on UE Feature Related Discussion", 3GPP TSG RAN WG1 #98, 3GPP R1-1909480, Aug. 26, 2019.
Office Action for CN Patent Application No. 201980100003.3; Aug. 20, 2024.
Office Action for JP Patent Application No. 2023-199770; Oct. 15, 2024.
Notice of Allowance for CN 201980100003.3; Jun. 17, 2025.
Nokia et al. "On procedures for beam selection and feedback signaling" 3GPP TSG-RAN WG1#87 R1-1612862; Nov. 14, 2016.
Office Action for JP No. 2023-199770; Feb. 27, 2025.

* cited by examiner

| Band Combination | Support Independent Beam Steering? |
|---|---|
| Band X, Band Y | No |
| Band X, Band Z | Yes |
| Band Y, Band Z | Yes |
| Band X, Band Y, Band Z | Yes |

FIG. 9

| Band Group | Frequency Band(s) |
|---|---|
| Group 1 | Band X, Band Y |
| Group 2 | Band Z |

FIG. 10

| Band Group | Lower Freq. | Upper Freq. |
|---|---|---|
| Group 1 | ARFCN_{L, 1} | ARFCN_{H, 1} |
| Group 2 | ARFCN_{L, 2} | ARFCN_{H, 2} |

FIG. 11

COMMON ANALOG BEAM STEERING FOR BAND GROUPS

PRIORITY CLAIM

This application is a national phase entry of PCT application number PCT/CN2019/104667, entitled "Common Analog Beam Steering for Band Groups," filed Sep. 6, 2019, which is hereby incorporated by reference in its entirety as though fully and completely set forth herein.

FIELD

The present application relates to wireless devices, and including to apparatuses, systems, and methods for a wireless device and a cellular base station to support common analog beam steering for band groups.

DESCRIPTION OF THE RELATED ART

Wireless communication systems are rapidly growing in usage. Further, wireless communication technology has evolved from voice-only communications to also include the transmission of data, such as Internet and multimedia content. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHIRPD), IEEE 802.11 (WLAN or Wi-Fi), BLUETOOTH™, etc.

In many instances, a wireless device may be able to communicate using multiple carriers according to a wireless communication technology, or even using multiple such technologies in a coordinated manner. However, determining how best to utilize multiple carriers and/or wireless communication technologies together in a wireless device in a complementary manner may be a complex task. Thus, improvements in the field are desired.

SUMMARY

Embodiments relate to apparatuses, systems, and methods for a wireless device and a cellular base station to support common analog beam steering for band groups.

The techniques described herein may include a variety of possible approaches to reporting beam steering capabilities of a wireless device to a cellular network. In particular, reporting of whether a wireless device can support independent beam steering for various possible frequency band combinations and/or frequency band groups may be supported.

Such information may be used by the cellular network to determine whether to configure a common beam for multiple component carriers for a wireless device. For example, the cellular network may configure a wireless device with a common beam for multiple component carriers if those component carriers are within a frequency band group for which the wireless device does not have independent beam steering capability. This may help avoid scenarios in which a wireless device could be configured to use independent beams for different component carriers when the wireless device would not be capable of supporting independent beams for those component carriers.

Additionally, techniques are described herein for potentially reducing beam configuration signaling overhead in scenarios in which a common beam is configured for multiple component carriers, and for potentially handling certain scenarios in which a cellular network provides beam configuration information to a wireless device that violates the beam steering capability of the wireless device.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 9-11 are tables illustrating exemplary aspects of various possible approaches to indicating beam steering capabilities of a wireless device, according to some embodiments.

Figure 1:
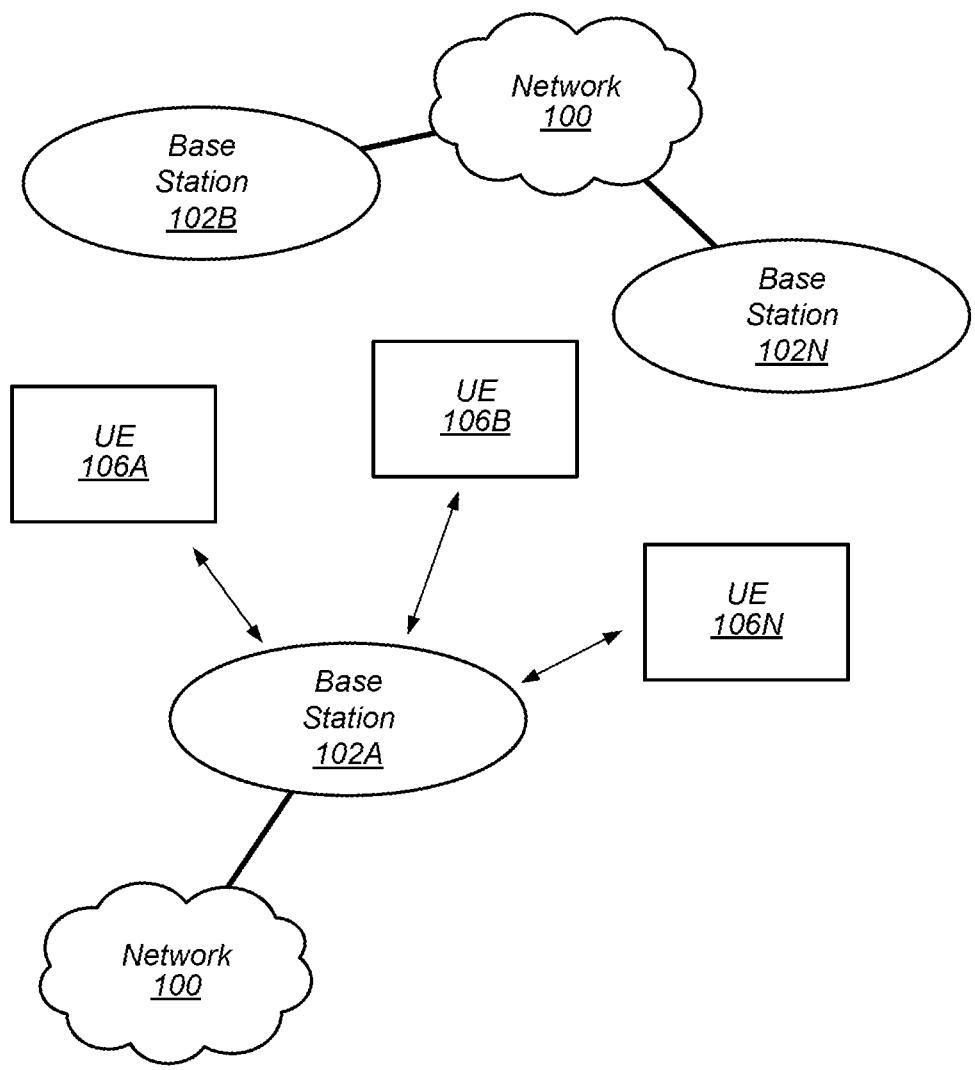
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Figure 2:
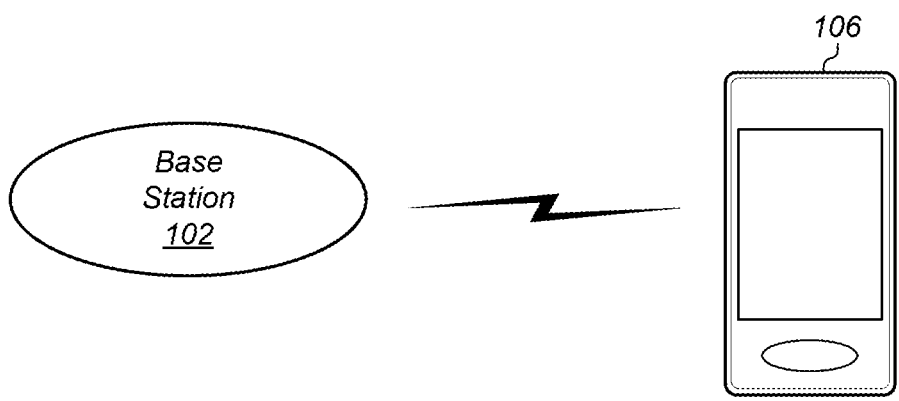
FIG. 2 illustrates a base station (BS) in communication with a user equipment (UE) device, according to some embodiments.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.
FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHIRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. As another possibility, base station 102A may be an LTE base station, or "eNB". In some embodiments, an eNB may be connected to a legacy evolved packet core (EPC) network and/or to a NR core (NRC) network.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT, or LTE or GSM), and separate radios for communicating using each of Wi-Fi and Bluetooth. Other configurations are also possible.

Figure 3:
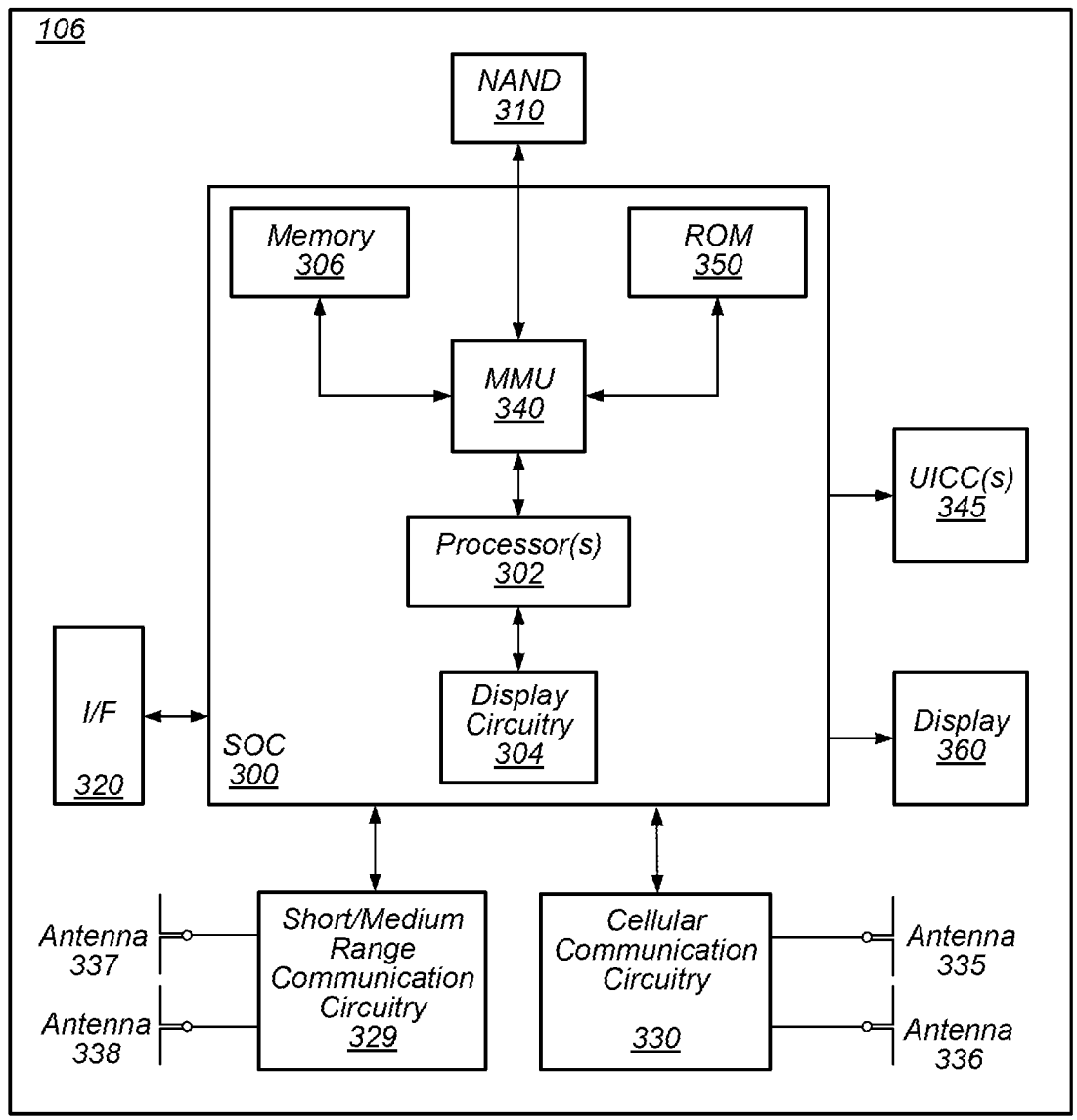
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT (or that also operates according to the first RAT). The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for supporting common analog beam steering for band groups, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 335, 336, 337, 338, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
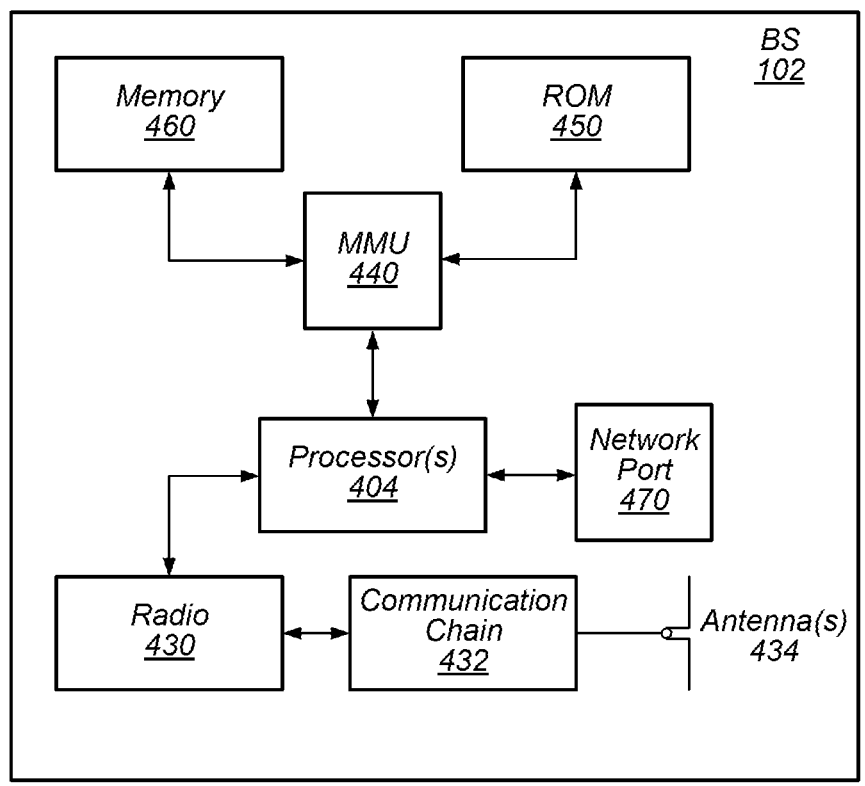
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
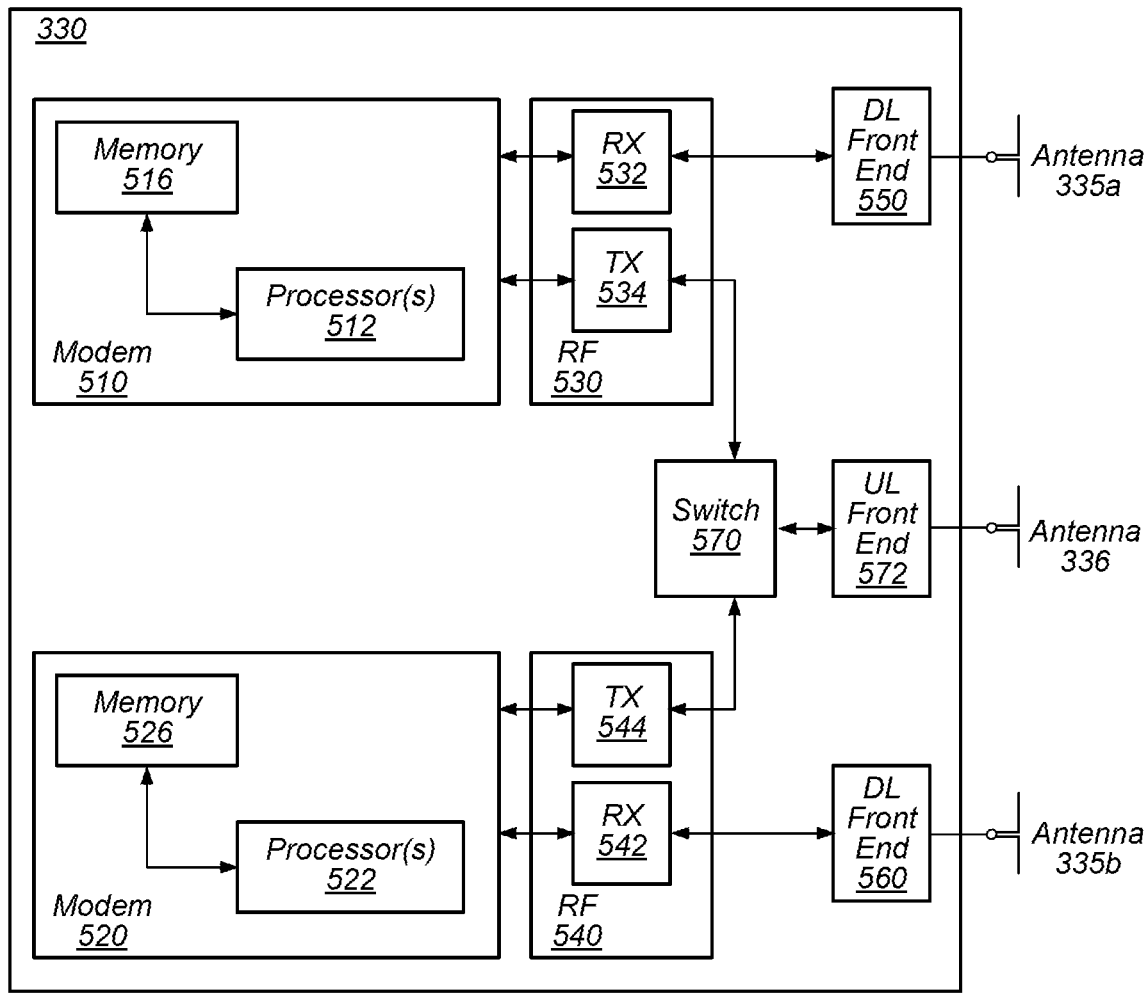
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to some embodiments, cellular communication circuitry 330 may be included in a communication device, such as communication device 106 described above herein. As noted above herein, communication device 106 may be a user equipment (UE) device, a mobile device or mobile station, a wireless device or wireless station, a desktop computer or computing device, a mobile computing device (e.g., a laptop, notebook, or portable computing device), a wearable device, a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to, e.g., communicatively; directly or indirectly), dedicated processors, and/or radios for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, such as LTE or LTE-A, and modem 520 may be configured for communications according to a second RAT, such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for supporting common analog beam steering for band groups, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for supporting common analog beam steering for band groups, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
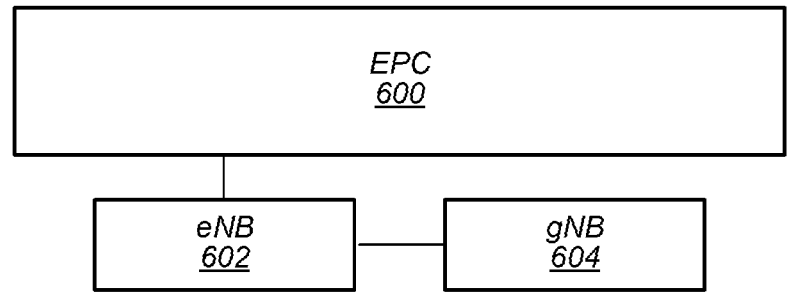
FIG. 6A illustrates an example of connections between an EPC network, an LTE base station (eNB), and a 5G NR base station (gNB), according to some embodiments.
Figure 6B:
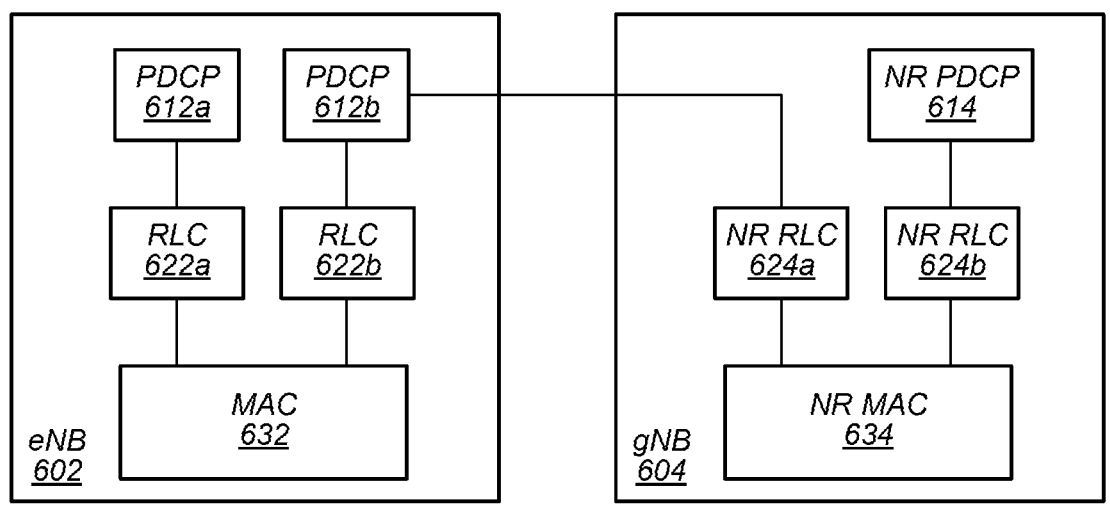
FIG. 6B illustrates an example of a protocol stack for an eNB and a gNB, according to some embodiments.

FIGS. 6A-6B—5G NR Non-Standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Thus, FIGS. 6A-6B may represent aspects of one possible cellular communication system that implements dual connectivity. However, it should be noted that numerous other dual (or more generally multiple) connectivity configurations are also possible, and that features of this disclosure can be implemented any of a variety of such configurations. Some other examples could include a configuration in which a gNB can be configured as a master node and an eNB can be configured as a secondary node, or a configuration in which both a master node and a secondary node operate according to the same RAT (e.g., both operate according to NR, both operate according to LTE, etc.), among various other possible configurations. In some instances, a configuration in which multiple cells (e.g., a primary or master cell (PCELL) and one or more secondary cells (SCELLS) are provided according to the same RAT may also be referred to as a carrier aggregation configuration.

Figure 7:
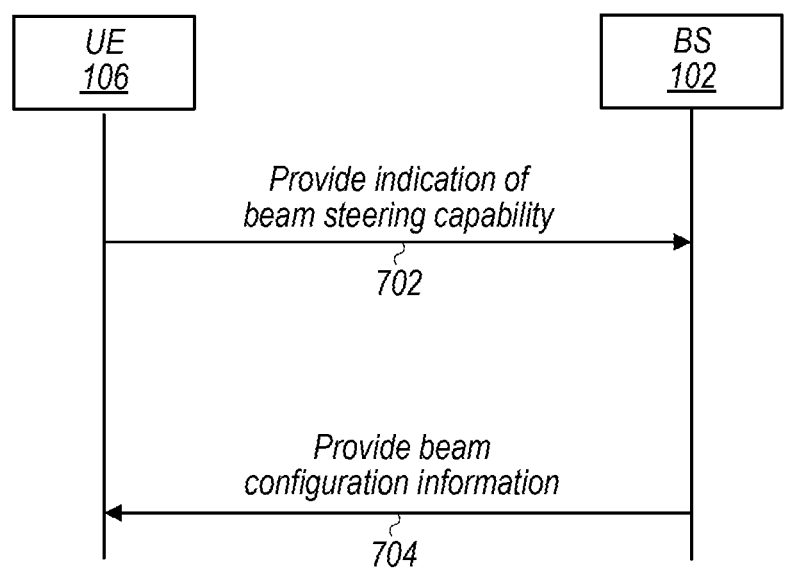
FIG. 7 is a signal flow diagram illustrating an example method for a wireless device and a cellular base station to use an assistance information framework to perform fast carrier aggregation and dual connectivity configuration, according to some embodiments.

FIG. 7—Common Analog Beam Steering for Band Groups

As wireless communication becomes increasingly common and is used for an increasing range of use cases, the number of frequency bands and range of frequencies in which wireless communication can be performed is expanding. Further, in many frequencies that can be used for wireless communication, beamforming techniques (e.g., to increase effective communication range in view of propagation characteristics at certain frequencies) may commonly be used. Accordingly, in order to support operation in a wide frequency range and/or in a variety of frequency ranges, it may be the case that a wireless device is designed to include one or more sets of analog beam steering hardware that can each be used to steer an analog beam in a certain frequency range.

Such wireless device design characteristics can impact the capability of a wireless device, e.g., with respect to how many independent beams the wireless device is capable of utilizing in conjunction with each of various frequency ranges. However, the number of sets of analog beam steering hardware and/or the frequency range(s) associated with each set of analog beam steering hardware can vary from device to device.

For example, consider a wireless device that includes only one set of analog beam steering hardware that can be used to steer an analog beam in a certain frequency range that includes two frequency bands. The wireless device may not be able to support independent beams for component carriers of a carrier aggregation scheme that are deployed in the two frequency bands. Consider also, in contrast, a wireless device that includes a set of analog beam steering hardware that can be used to steer an analog beam in a certain frequency range that includes one of those two frequency bands, and also includes a set of analog beam steering hardware that can be used to steer an analog beam in a certain frequency range that includes the other of those two frequency bands. This wireless device may be able to support independent beams for component carriers of a carrier aggregation scheme that are deployed in the two frequency bands.

Thus, different wireless devices may have different beam steering capabilities, which may in turn affect which beam configurations are possible for different wireless devices. Accordingly, it may be useful to provide a framework for reporting wireless device beam steering capabilities to a cellular network, and for the cellular network to consider the beam steering capabilities of a wireless device when performing beam configuration for the wireless device such as to remain within the wireless device's beam steering capabilities.

FIG. 7 is a flowchart diagram illustrating an example method for a wireless device and a cellular base station to support reporting wireless device beam steering capabilities and common analog beam steering for band groups, according to some embodiments. Aspects of the method of FIG. 7 may be implemented by a wireless device and a cellular base station, such as a UE 106 and a BS 102 illustrated in various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the method shown may be performed concurrently, in a different order than shown, may be substituted for by other method elements, or may be omitted. Additional elements may also be performed as desired. As shown, the method may operate as follows.

In 702, the wireless device may provide an indication of the analog beam steering capability of the wireless device to the cellular base station. The indication may be provided in conjunction with other wireless device capability information or independently, and may be signaled using radio resource control (RRC) signaling, media access control (MAC) control element (CE) signaling, and/or in any of various other ways.

The indication may include any of various possible information indicative of the analog beam steering capability of the wireless device. As one possibility, the wireless device may provide capability information indicating one or more frequency band combinations supported by the wireless device, and for each such frequency band combinations, the wireless device could include an indicator (e.g., a 1 bit flag, or any of various other possible indicators) of whether the wireless device supports independent beam steering for the band combination. Thus, if the wireless device supports performing cellular communication using a certain frequency band combination, but those frequency bands are supported within the wireless device by the same set of analog beam steering hardware, the wireless device may report that the wireless device does not support independent beam steering for the band combination. In contrast, if the wireless device supports performing cellular communication using a certain frequency band combination, and those frequency bands are supported within the wireless device by different sets of analog beam steering hardware, the wireless device may report that the wireless device does support independent beam steering for the band combination.

As another possibility, the wireless device may provide capability information indicating one or more band groups for which the wireless device has analog beam steering capability. Each band group for which the wireless device has analog beam steering capability may be defined or specified in any of various ways. As one possible mechanism, the indication may specify one or more bands included in each of the one or more band groups, for example by listing band index values associated with each of the bands included in each band group. As another possible mechanism, the indication may specify a frequency range associated with each of the one or more band groups, for example by indicating a lower bound frequency and an upper bound frequency for each band group. Note that such an approach may be capable of supporting more accurate beam steering capability reporting, e.g., in a scenario in which one or more sets of beam steering hardware of a wireless device supports beam steering for a frequency range that includes part of one or more frequency bands.

Additionally, in some instances, if the wireless device is reporting one or more band groups for which the wireless device has analog beam steering capability, the wireless device may further indicate how many independent simultaneous analog beams the wireless device supports for each of the one or more band groups. Support for reporting such information may be useful, e.g., in case a wireless device includes multiple sets of beam steering hardware for a certain (e.g., commonly used) frequency range, at least in some instances.

In some instances, support may additionally or alternatively be provided for a wireless device to provide a temporary capability indication regarding the analog beam steering capability of the wireless device. For example, providing support for a wireless device to temporarily modify its analog beam steering capability as understood by the network may provide additional flexibility to the wireless device to manage thermal conditions, power consumption, and/or other considerations, at least according to some embodiments. If desired, prohibit timer could be implemented in conjunction with such temporary capability indications, e.g., such a prohibit timer may be initiated upon provision of a temporary capability indication regarding analog beam steering capability by a wireless device, and the wireless device may be expected to wait until expiry of the prohibit timer to provide another temporary capability indication regarding analog beam steering capability, and/or the cellular network may not accept another temporary capability indication regarding analog beam steering capability from the wireless device until expiry of the prohibit timer.

Thus, in such a case, if the wireless device provides a temporary capability indication of analog beam steering capability of the wireless device to the cellular base station, the wireless device waits at least until expiry of the prohibit timer to provide another temporary capability indication of analog beam steering capability of the wireless device to the cellular base station, e.g., based at least in part on the prohibit timer.

In 704, the cellular base station may provide beam configuration information to the wireless device. The beam configuration information may be selected based at least in part on the beam steering capability indication provided by the wireless device. For example, at least in some instances, the indication of analog beam steering capability of the wireless device may include information indicating that the wireless device supports a limited number of analog beams for each of one or more band groups. In such a scenario, the cellular base station may select a beam configuration that does not exceed the number of analog beams supported by the wireless device for each of the one or more band groups.

At least according to some embodiments, this may include providing a common beam configuration for multiple component carriers configured for the wireless device by the cellular base station. For example, if multiple component carriers are configured that are all within a band group for which the wireless device can only support one beam, the cellular base station may configure a common beam for those component carriers, based at least in part on the beam steering capability indication provided by the wireless device.

Additionally, at least in some instances, if multiple component carriers are configured with the same beam configuration, it may be the case that the cellular base station can potentially reduce signaling overhead in one or more ways in conjunction with providing beam configuration information. For example, as one possibility, the cellular base station may provide beam configuration information for multiple control channels in the same signaling indication, e.g., by indicating a band group identifier, a control channel group identifier, or a list of applicable control channel identifiers to which to apply a certain beam configuration when indicating the beam configuration. As another possibility, the cellular base station could provide downlink control information for each of multiple component carriers that are within the same frequency band group, and the downlink control information for one of the component carriers could include beam configuration information while beam configuration information may be omitted from the downlink control information for the other component carrier. In such a scenario, the wireless device may be able to use the beam configuration information from the other component carrier that is within the same frequency band group to determine which beam to use. As a still further possibility, the cellular base station may be able to provide downlink control information triggering multiple aperiodic reference signal communications in different component carriers that are within the same frequency band group using the same beam configuration. Variations on such signaling overhead reduction techniques and/or other signaling overhead reduction techniques are also possible.

It may further be beneficial to provide one or more handling techniques for scenarios in which a cellular base station provides beam configuration information in violation of the indicated analog beam steering capability of a wireless device, at least according to some embodiments. For example, in case the cellular base station provides beam configuration information that configures more independent beams than the wireless device can support for a given band group, the wireless device may select a subset of the configured beams that are within the analog beam steering capability of the wireless device, and may attempt to communicate (e.g., perform uplink or downlink communication) using the selected subset of the configured beams.

In such a scenario, the wireless device may use certain priority rules and/or other default selection criteria to select which of the beams configured by the cellular base station to use. For example, in case the wireless device is selecting between beams that are configured for different types of physical layer channels, a certain priority order of the different types of physical layer channels may be predetermined, and the priority order may be used such that a beam associated with the highest priority physical layer channel among the beams being selected from is first to be selected. As another example, in case the wireless device is selecting between beams that are configured for the same type of physical layer channel, certain default selection criteria may be defined to facilitate selection of a one or more default beams. For example, the default selection criteria may include preferentially selecting a beam with a lowest index or identifier value for one or more characteristics (e.g., component carrier index, control resource set identifier, etc.) of the beam.

Thus, by providing a framework for reporting beam steering capability information and providing common beam steering for specified band groups such as described herein, it may be possible to better support the operation of wireless devices having a variety of hardware designs in a wide frequency range, at least according to some embodiments.

FIGS. 8-15 and Additional Information

FIGS. 8-15 and the following additional information are provided by way of example of various considerations and details relating to possible systems in which the method of FIG. 7 and/or other aspects of this disclosure may be implemented, and are not intended to be limiting to the disclosure as a whole. Numerous variations and alternatives to the details provided herein below are possible and should be considered within the scope of the disclosure.

In at least some instances, it may be the case that a wireless device is designed to include analog beam steering hardware that can be used to steer analog beams in a relatively wide frequency range. A wireless device could potentially have multiple such sets of analog beam steering hardware, e.g., to support wireless communication in multiple frequency ranges, such as a low, medium, and high frequency range, each of which could include multiple frequency bands, for example in conjunction with the frequency bands included in 3GPP NR frequency range 2 (FR2). In such a scenario, it may be the case that each frequency band group can include multiple frequency bands, and due to the hardware configuration of the wireless device, all transmission/reception within each frequency band group at any given time may have to be performed with the same analog beam. Different wireless devices may include different designs, different RF components, etc., such that the analog beam steering capabilities may differ between different wireless devices.

In accordance with 3GPP carrier aggregation communication techniques, it may currently be the case that beams are independently configured for each component carrier, for example via downlink control information (DCI) for physical downlink shared channel (PDSCH), physical uplink shared channel (PUSCH), aperiodic channel state information reference signals (A-CSI-RS), or aperiodic sounding reference signal (A-SRS) communications, or via media access control (MAC) control element (CE) for physical downlink control channel (PDCCH) or physical uplink control channel (PUCCH) communications. Thus, absent a framework supporting indication and consideration of any analog beam steering limitations (e.g., hardware-based or otherwise) of a wireless device, it could be possible for a cellular base station to provide a beam configuration to a wireless device that the wireless device is not capable of supporting.

Figure 8:
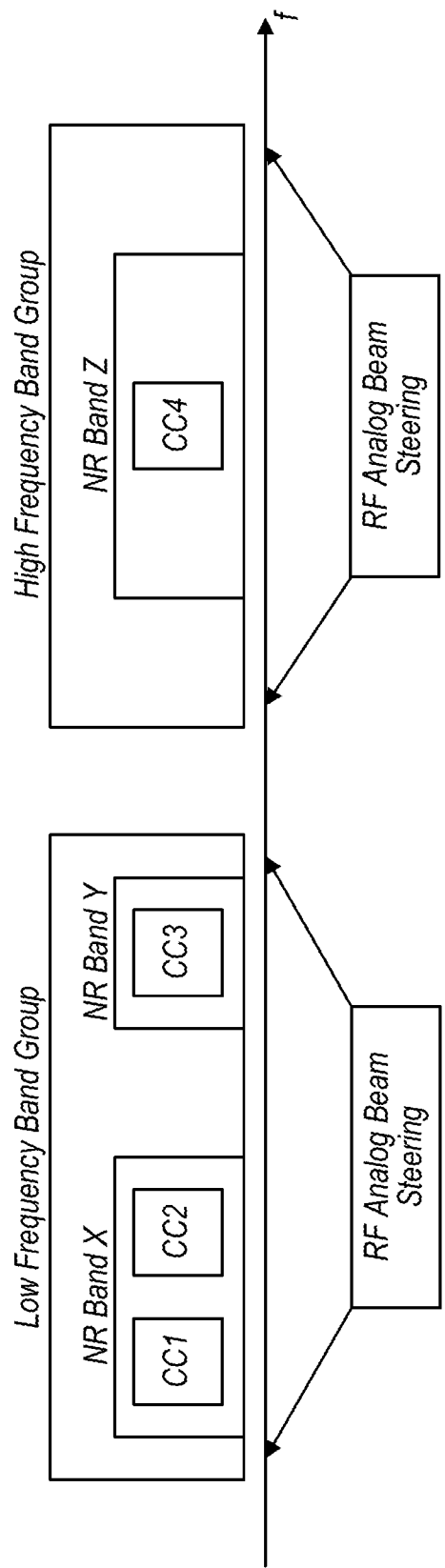
FIG. 8 illustrates exemplary aspects of a possible scenario in which a wireless device includes analog beam steering hardware capable of supporting independent beam steering for two frequency band groups, according to some embodiments.

Accordingly, it may be beneficial to provide such a framework for supporting indication and consideration of a wireless device's analog beam steering capability in a cellular communication system, at least in some scenarios. As an example, FIG. 8 illustrates aspects of one such scenario, in which a wireless device includes analog beam steering hardware capable of supporting independent beam steering for two frequency band groups, and in which multiple component carriers are configured within one of the band groups, according to some embodiments. As shown, in the illustrated scenario, the wireless device may have independent RF analog beam steering capability for each of a low frequency band group and a high frequency band group. The low frequency band group may include at least two frequency bands ("Band X" and "Band Y") while the high frequency band group may include at least one additional frequency band ("Band Z"). The wireless device may be configured with four component carriers in the illustrated scenario, including two in Band X, one in Band Y, and one in Band Z.

There may be multiple possible approaches to signaling the beam steering capability of the wireless device to the cellular base station that provides a primary/serving cell to the wireless device. According to one possible approach, a flag may be used to indicate whether a UE supports independent beam steering in conjunction with each band combination supported by the UE. FIG. 9 is a table illustrating aspects of how such an analog beam steering capability reporting approach could be implemented in conjunction with the example scenario of FIG. 8.

As shown, according to such an analog beam steering capability reporting approach, the UE may report for the band combination [Band X, Band Y] that independent beam steering is not supported, e.g., since both of those frequency bands may fall in the low frequency band group. For the band combinations [Band X, Band Z] and [Band Y, Band Z], the UE may report that independent beam steering is supported, e.g., since in both of those band combinations, one frequency bands falls in the low frequency band group and one frequency band falls in the high frequency band group. For the band combination [Band X, Band Y, Band Z], the UE may report that that independent beam steering is supported, since for that band combination, at least one frequency bands falls in the low frequency band group and at least one frequency band falls in the high frequency band group. Note that for such a large band combination (e.g., including more than two bands), it may be the case that the independent beam steering capability indications for the subsets of the large band combination may be considered as overwriting the independent beam steering capability indication for the large band combination, e.g., to overcome any potential conflict or ambiguity in such a beam steering capability reporting approach.

As another possible approach, a UE may report its beam steering capability by indicating one or more band groups for which the UE includes beam steering capability. In some instances, the UE may indicate which frequency bands are included in each band group. FIG. 10 is a table illustrating aspects of how such an analog beam steering capability reporting approach could be implemented in conjunction with the example scenario of FIG. 8. As shown, according to such an analog beam steering capability reporting approach, the UE may report that the UE has analog beam steering capability for two band groups, where the first band group includes Band X and Band Y, while the second band group includes Band Z.

Alternatively, the UE may indicate lower- and upper-bounds (e.g., using absolute radio frequency channel number (ARFCN) or any of various other possible mechanisms) of the frequency range associated with each band group. FIG. 11 is a table illustrating aspects of how such an analog beam steering capability reporting approach could be implemented in conjunction with the example scenario of FIG. 8. As shown, according to such an analog beam steering capability reporting approach, the UE may report that the UE has analog beam steering capability for two band groups, where the first band group includes any bands from a first lower bound ARFCN ("ARFCN_$\{L,1\}$") to a first higher bound ARFCN ("ARFCN_$\{H,1\}$"), such as Band X and Band Y, while the second band group includes any bands from a second lower bound ARFCN ("ARFCN_$\{L,2\}$") to a second higher bound ARFCN ("ARFCN_$\{H,2\}$"), such as Band Z.

According to some embodiments, it may be the case that the UE's reporting of one or more band groups for which the UE includes beam steering capability is considered as specifying that within the same band group, all component carriers have to use the same beam, and that across different band groups, different component carriers can use independently configured beams. Alternatively, it may be possible that the UE specifically reports how many independent analog beams can be used simultaneously for each frequency band group. Such an approach may provide more flexibility, e.g., in case a UE has analog beam steering hardware capability for supporting multiple independent beams for one or more band groups.

According to some embodiments, support may be provided for a UE to signal a temporary capability indication, e.g., to temporarily change its beam steering capability. For example, support for such reporting may be useful to allow a UE to choose to report beam steering that is lower than the beam steering capability supported by the UE's hardware configuration, e.g., to help the UE to manage its thermal control, perform power consumption optimization, and/or for various other reasons. At least in some instances, the network may not be obligated to accept such temporary capability signaling (e.g., may be able to reject or accept it), and the network may inform the UE regarding whether the temporary capability signaling is accepted or rejected by the network. The network may inform the UE of its decision via RRC, MAC CE, or DCI, among various signaling possibilities. Additionally, if desired, the network may configure a prohibit timer in conjunction with such temporary capability signaling. For example, such a prohibit timer may be initiated upon a UE providing temporary capability signaling regarding its beam steering capability, and the network may not accept any further temporary capability signaling regarding the beam steering capability of the UE until expiry of the prohibit timer.

Figure 12:
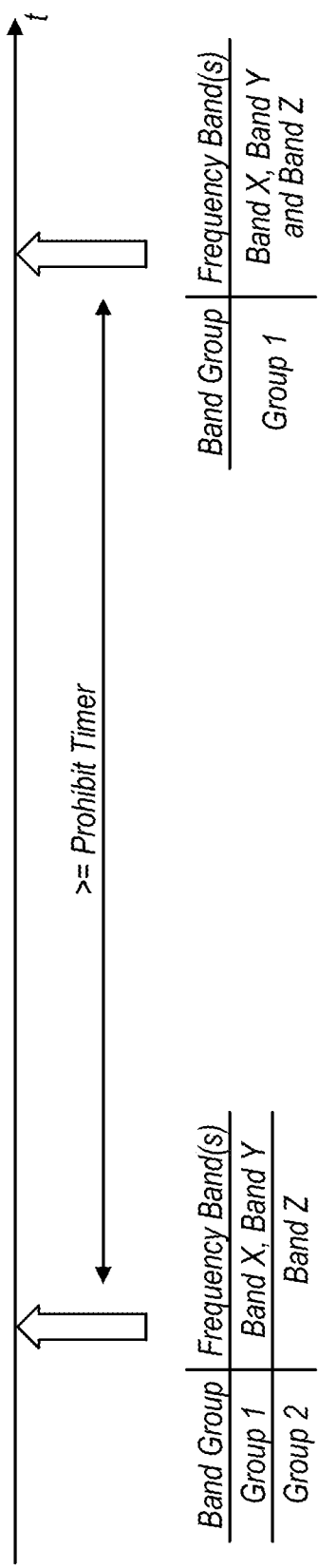
FIG. 12 illustrates exemplary aspects of a possible scenario in which a prohibit timer is used to manage how frequently a wireless device can perform beam steering capability reporting.

FIG. 12 illustrates exemplary aspects of a possible scenario in which such a prohibit timer is used to manage how frequently a wireless device can perform temporary beam steering capability reporting. As shown, in the illustrated scenario, a UE may initially indicate that it has independent beam steering capability for two band groups, the first of which may include Band X and Band Y, and the second of which may include Band Z. Based on providing such an indication, a prohibit timer may be initiated. After expiration of the prohibit timer, the UE may provide a temporary beam steering capability indication for the UE, which may indicate that it has independent beam steering capability for only one band groups, which may include Band X, Band Y, and Band Z. Thus, the UE may use the temporary beam steering capability indication to attempt to avoid being configured with multiple beams, which may help the UE avoid thermal conditions, reduce power consumption, and/or otherwise affect UE operation in one or more ways that may be desirable under at least certain circumstances. The UE could similarly later (e.g., after expiry of a further instance of the prohibit timer) provide an updated temporary beam steering capability indication, e.g., to again indicate that it has independent beam steering capability for two band groups, if desired, for example to improve data throughput and/or for any of various other possible reasons.

In addition to providing a framework for a UE to report its analog beam steering capability, it may be useful to consider how to handle scenarios in which a network configures a UE in violation of its beam steering capability, such as if a network configures different beams on different component carriers for which the UE has indicated that it cannot support different beams. As one possibility, it may be possible to leave the UE behavior in such a scenario unspecified, e.g., such that the network should not expect any particular behavior or performance from a UE when the network configuration violates the reported UE beam steering capability. As another possibility, when the network configuration violates the reported UE beam steering capability, it may be possible to specify certain default or fallback rules or behaviors (e.g., in accordance with a 3GPP cellular communication standard) for the UE to follow.

For example, in a scenario in which the network configuration violates the UE beam steering capability such that two different beams are configured on two component carriers for different physical layer channels when the UE only supports one beam for those two component carriers, the UE may follow certain priority rules regarding the relative priority of different physical layer channels. As one possible priority order, downlink physical layer channels could be prioritized in the following order: PDCCH>A-CSI-RS>SSB>PDSCH>P/SP CSI-RS. Similarly, uplink physical layer channels could be prioritized in the following order: PUCCH>A-SRS>SSB>PUSCH>P/SP SRS. Note that these priority orders are provided by way of example only, and that any of various other priority orders are also possible. In such a scenario, the UE may use the beam(s) with the highest priority among the conflicting beams.

As another example, in a scenario in which the network configuration violates the UE beam steering capability such that two different beams are configured on two component carriers for the same physical layer channel when the UE only supports one beam for those two component carriers, the UE may follow certain priority rules or default beam selection criteria to select which beam(s) to use. As one possibility, for the PDSCH, the beam with the lowest TCI may be considered the default beam. Alternatively, the beam with the lowest control resource set (CORESET) ID, the beam with the lowest component carrier index, and/or any of various other characteristics may be considered to determine which beam is considered the default beam. Similarly, for the PDCCH, the default beam could be defined as the beam with the lowest CORESET ID, the beam with the lowest component carrier index, or in any of various other possible ways. In such a scenario, the UE may use the beam(s) that is (are) considered the default beam(s) among the conflicting beams.

Given that such a UE beam steering capability reporting framework may, at least in some instances, result in a common beam being configured for multiple component carriers (potentially including for reception or transmission), there may further be possibilities for reducing beam configuration overhead in accordance with such a framework.

For example, it may be possible to support use of the same MAC CE to configure a beam for multiple control channels (e.g., PUCCH/PDCCH) together. As one such possibility, the frequency band group ID can be given in the MAC CE to update all of the control beams in that frequency band group. As another possibility for a finer level of configuration granularity, a control channel group could be defined by indicating which control channels are in the control channel group, and the control channel group ID can be given in the MAC CE to update all of the control beams in that control channel group. As a still further possibility, a list of PUCCH/PDCCH IDs can be given in the MAC CE to update all of the control beams indicated, if desired. It should be noted that such an approach may have a greater overhead and/or may require adding a new MAC CE or updating an existing MAC CE format to account for the possibility of indicating multiple PUCCH/PDCCH IDs when providing a MAC CE for control channel beam configuration.

As another possibility, it may be possible to provide DCI that is configured with or without TCI/SRI to reduce overhead, with or without cross carrier scheduling, in case of multiple component carriers that are within the same frequency band group for a UE being configured. For example, when a UE receives DCI that does not contain TCI or SRI for one component carrier, and also receives DCI that contains TCI or SRI for another component carrier, the UE may follow the DCI that contains TCI or SRI within the same frequency band group to decide which beam to use.

As a still further possibility, for A-CSI-RS or A-SRS triggering, it may be possible to provide DCI that triggers multiple A-CSI-RS or A-SRS in different component carriers with the same beam. For example, such DCI may indicate one TCI/SRI and may include a list of A-CSI-RS or A-SRS configurations for each component carrier. Alternatively, it may be possible to provide DCI that triggers A-CSI-RS or A-SRS without providing TCI or SRI, provided the UE has beam configuration for another component carrier within the same frequency band group, as the UE may be able to use that beam for the A-CSI-RS or A-SRS.

In the following further exemplary embodiments are provided.

One set of embodiments may include an apparatus for operating a wireless device, comprising: a processor configured to cause the wireless device to: provide an indication of analog beam steering capability of the wireless device to a cellular base station; receive beam configuration information from the cellular base station, wherein the beam configuration information configures one or more beams between the cellular base station and the wireless device within the analog beam steering capability of the wireless device.

According to some embodiments, the indication of analog beam steering capability of the wireless device comprises: an indication of whether the wireless device supports independent beam steering for each of one or more band combinations.

According to some embodiments, the indication of analog beam steering capability of the wireless device comprises: an indication of one or more band groups for which the wireless device has analog beam steering capability.

According to some embodiments, the indication specifies one or more bands included in each of the one or more band groups.

According to some embodiments, the indication specifies a frequency range associated with each of the one or more band groups.

According to some embodiments, the indication specifies how many independent simultaneous analog beams the wireless device supports for each of the one or more band groups.

According to some embodiments, the indication of analog beam steering capability of the wireless device comprises a temporary capability indication, wherein the processor is further configured to cause the wireless device to: initiate a prohibit timer based at least in part on providing the temporary capability indication; and wait at least until expiry of the prohibit timer to provide another temporary capability indication of analog beam steering capability of the wireless device to the cellular base station based at least in part on the prohibit timer.

Another set of embodiments may include a wireless device, comprising: an antenna; a radio coupled to the antenna; and a processing element coupled to the radio; wherein the wireless device is configured to: provide an indication of analog beam steering capability of the wireless device to a cellular base station; and receive beam configuration information from the cellular base station.

According to some embodiments, the indication of analog beam steering capability of the wireless device comprises an indication that the wireless device does not support independent analog beam steering within at least a first band group, wherein the beam configuration information configures a common beam for multiple control channels within the first band group.

According to some embodiments, the wireless device is further configured to: receive downlink control information for a first component carrier and for a second component carrier, wherein the first component carrier and the second component carrier are within the first band group, wherein the downlink control information includes beam configuration information for the first component carrier and does not include beam configuration information for the second component carrier; and determine a beam to use for the second component carrier based at least in part on the beam configuration information received for the first component carrier.

According to some embodiments, the indication of analog beam steering capability of the wireless device comprises an indication that the wireless device does not support independent analog beam steering within at least a first band group, wherein the wireless device is further configured to: receive downlink control information triggering multiple aperiodic reference signal communications in different component carriers within the first band group using a same beam configuration.

According to some embodiments, if the beam configuration information is in violation of the analog beam steering capability of the wireless device, the wireless device is further configured to: select one or more beams configured by the beam configuration information that are within the analog beam steering capability of the wireless device, wherein the selected one or more beams comprise fewer beams than a number of beams configured by the beam configuration information; and attempt to communicate with the cellular base station using the selected one or more beams.

According to some embodiments, the wireless device is further configured to: determine that the beam configuration information is in violation of the analog beam steering capability of the wireless device based at least in part on the beam configuration information configuring a greater number of beams than supported by the analog beam steering capability of the wireless device.

According to some embodiments, the greater number of beams than supported by the analog beam steering capability of the wireless device comprise at least two beams configured for different types of physical layer channels, wherein the wireless device is further configured to: select a number of beams configured by the beam configuration information that are within the analog beam steering capability of the wireless device based at least in part on a predetermined priority order of the different types of physical layer channels.

According to some embodiments, the greater number of beams than supported by the analog beam steering capability of the wireless device comprise at least two beams configured for a same type of physical layer channel, wherein the wireless device is further configured to: select a number of beams configured by the beam configuration information that are within the analog beam steering capability of the wireless device based at least in part on a predetermined priority order of one or more characteristics of the beams.

Yet another set of embodiments may include a cellular base station, comprising: an antenna; a radio coupled to the antenna; and a processing element coupled to the radio; wherein the cellular base station is configured to: receive an indication of analog beam steering capability of a wireless device; select beam configuration information for the wireless device based at least in part on the indication of analog beam steering capability of the wireless device; and provide the beam configuration information to the wireless device.

According to some embodiments, the indication of analog beam steering capability of a wireless device comprises information indicating that the wireless device supports a limited number of analog beams for each of one or more band groups, wherein to select beam configuration information for the wireless device, the cellular base station is further configured to: select a beam configuration that does not exceed the number of analog beams supported by the wireless device for each of the one or more band groups.

According to some embodiments, the indication of analog beam steering capability of the wireless device comprises an indication that the wireless device does not support independent analog beam steering within at least a first band group, wherein the cellular base station is further configured to: select beam configuration information that configures a common beam for multiple component carriers within the first band group based at least in part on the wireless device not supporting independent analog beam steering within the first band group.

According to some embodiments, the cellular base station is further configured to: provide downlink control information for a first component carrier and for a second component carrier, wherein the first component carrier and the second component carrier are within the first band group, wherein the downlink control information includes beam configuration information for the first component carrier and does not include beam configuration information for the second component carrier.

According to some embodiments, the indication of analog beam steering capability of the wireless device comprises an indication that the wireless device does not support independent analog beam steering within at least a first band group, wherein the cellular base station is further configured to: provide downlink control information triggering multiple aperiodic reference signal communications in different component carriers within the first band group using a same beam configuration.

Another set of embodiments may include an apparatus, comprising: a processor configured to cause a device to perform any or all parts of the preceding examples.

Yet another exemplary embodiment may include a method, comprising: performing, by a device, any or all parts of the preceding examples.

Still another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor configured to:
provide an indication of beam steering capability of a wireless device to a cellular base station, wherein the beam steering capability indicates whether beam steering is independent for a band combination or whether it is common to bands of the band combination; and
perform communications in the band combination in accordance with the indication of beam steering capability.

2. The baseband processor of claim 1, wherein beam steering being independent for a band combination is associated with a capability of the wireless device to independently configure respective beams for respective bands of the band combination, wherein beam steering being common to bands of a band combination is associated with a capability of the wireless device to commonly configure beams across bands of the band combination, and wherein the indication of beam steering capability of the wireless device comprises:
an indication of one or more band groups for which the wireless device has beam steering capability.

3. The baseband processor of claim 2,
wherein the indication specifies one or more bands included in each of the one or more band groups.

4. The baseband processor of claim 2,
wherein the indication specifies a frequency range associated with each of the one or more band groups.

5. The baseband processor of claim 1, wherein the beam steering capability is associated with one or more sets of beam steering hardware used to steer one or more beams in one or more frequency ranges, wherein the indication of beam steering capability of the wireless device indicates one or more beam configurations that the wireless device is capable of supporting, and
wherein the indication specifies how many independent simultaneous beams the wireless device supports for each of one or more band groups, band combinations, or frequency ranges.

6. The baseband processor of claim 1,
wherein the indication of beam steering capability of the wireless device comprises a temporary capability indication, wherein the baseband processor is further configured to:
initiate a prohibit timer based at least in part on providing the temporary capability indication; and
wait at least until expiry of the prohibit timer to provide another temporary capability indication of beam steering capability of the wireless device to the cellular base station based at least in part on the prohibit timer.

7. A method, comprising:
providing an indication of beam steering capability of a wireless device to a cellular base station, wherein the beam steering capability indicates whether beam steering is independent for a band combination or whether it is common to bands of the band combination; and performing communications in the band combination in accordance with the indication of beam steering capability.

8. The method of claim 7, wherein the indication of beam steering capability of the wireless device comprises an indication that the wireless device does not support independent beam steering within at least a first band group, wherein the communications comprise using a common beam for multiple physical channels within the first band group.

9. The method of claim 8, further comprising:
receiving downlink control information for a first component carrier and for a second component carrier, wherein the first component carrier and the second component carrier are within the first band group, wherein the downlink control information includes beam configuration information for the first component carrier and does not include beam configuration information for the second component carrier; and
determining a beam to use for the second component carrier based at least in part on the beam configuration information received for the first component carrier.

10. The method of claim 7, wherein the indication of beam steering capability of the wireless device comprises an indication that the wireless device does not support independent beam steering within at least a first band group, and wherein the method further comprises:
receiving downlink control information triggering multiple aperiodic reference signal communications in different component carriers within the first band group using a same beam configuration.

11. The method of claim 7, wherein if beam configuration information is in violation of the beam steering capability of the wireless device, the method further comprises:
selecting one or more beams configured by the beam configuration information that are within the beam steering capability of the wireless device, wherein the selected one or more beams comprise fewer beams than a number of beams configured by the beam configuration information; and
attempting to communicate with the cellular base station using the selected one or more beams.

12. The method of claim 11, further comprising:
determining that the beam configuration information is in violation of the beam steering capability of the wireless device based at least in part on the beam configuration information configuring a greater number of beams than supported by the beam steering capability of the wireless device.

13. The method of claim 12, wherein the greater number of beams than supported by the beam steering capability of the wireless device comprise at least two beams configured for different types of physical layer channels, and wherein the method further comprises:
selecting a number of beams configured by the beam configuration information that are within the beam steering capability of the wireless device based at least in part on a predetermined priority order of different types of physical layer channels.

14. The method of claim 12, wherein the greater number of beams than supported by the beam steering capability of the wireless device comprise at least two beams configured for a same type of physical layer channel, and wherein the method further comprises:
selecting a number of beams configured by the beam configuration information that are within the beam steering capability of the wireless device based at least in part on a predetermined priority order of one or more characteristics of the beams.

15. A method, comprising:
receiving an indication of beam steering capability of a wireless device, wherein the beam steering capability indicates whether beam steering is independent for a band combination or whether it is common to bands of the band combination; and
receiving, from the wireless device, communications in the band combination in accordance with the indication of beam steering capability.

16. The method of claim 15, wherein the indication of beam steering capability of the wireless device comprises information indicating that the wireless device supports a limited number of beams for each of one or more band groups, wherein to select beam configuration information for the wireless device, the method further comprises:
selecting a beam configuration that does not exceed a number of beams supported by the wireless device for each of the one or more band groups.

17. The method of claim 15, wherein the indication of beam steering capability of the wireless device comprises an indication that the wireless device does not support independent beam steering within at least a first band group, and wherein the method further comprises:
selecting beam configuration information that configures a common beam for multiple component carriers within the first band group based at least in part on the wireless device not supporting independent beam steering within the first band group.

18. The method of claim 17, further comprising:
providing downlink control information for a first component carrier and for a second component carrier, wherein the first component carrier and the second component carrier are within the first band group, wherein the downlink control information includes beam configuration information for the first component carrier and does not include beam configuration information for the second component carrier.

19. The method of claim 15, wherein the indication of beam steering capability of the wireless device comprises an indication that the wireless device does not support independent beam steering within at least a first band group, and wherein the method further comprises:
providing downlink control information triggering multiple aperiodic reference signal communications in different component carriers within the first band group using a same beam configuration.

20. The method of claim 15, wherein the indication of beam steering capability of the wireless device comprises a temporary capability indication.

* * * * *